United States Patent [19]  [11] 4,012,347
Gitlitz et al.  [45] Mar. 15, 1977

[54] ANTIFOULING COMPOSITION

[75] Inventors: Melvin H. Gitlitz, Edison, N.J.;
Aaron Freiman, Brooklyn, N.Y.

[73] Assignee: M & T Chemicals Inc., Greenwich, Conn.

[22] Filed: Nov. 3, 1975

[21] Appl. No.: 628,360

[52] U.S. Cl. .................. 260/27 R; 260/27 BB; 260/24; 260/26; 424/76; 424/83; 424/288

[51] Int. Cl.$^2$ .................. C08K 5/58; C08K 5/57

[58] Field of Search .............. 260/27 R, 27 BB, 24, 260/26; 424/288, 78, 83

[56] References Cited

UNITED STATES PATENTS

| | | | |
|---|---|---|---|
| 2,579,610 | 12/1951 | Pitre et al. | 260/27 R |
| 2,592,655 | 4/1952 | Carlston et al. | 260/27 |
| 3,236,793 | 2/1966 | Robins et al. | 260/27 R |
| 3,615,744 | 10/1971 | Yokoo et al. | 260/27 R |
| 3,789,057 | 1/1974 | Reifenberg et al. | 424/288 |
| 3,794,501 | 2/1974 | De Nio | 260/27 R |

FOREIGN PATENTS OR APPLICATIONS

| | | | |
|---|---|---|---|
| 1,253,725 | 4/1960 | France | 424/288 |

*Primary Examiner*—V. P. Hoke
*Attorney, Agent, or Firm*—Robert P. Auber; Kenneth G. Wheeless; Robert Spector

[57] ABSTRACT

The antifouling performance of certain asymmetric triorganotin compounds exhibiting one or two cycloalkyl radicals bonded directly to the tin atom is significantly improved when these compounds are incorporated into coating compositions containing a film-forming polymer and rosin in a specified range of proportions.

5 Claims, No Drawings

4,012,347

ANTIFOULING COMPOSITION

BACKGROUND

This invention relates to antifouling coating compositions. This invention further relates to improved coating compositions for combatting the attachment and growth of barnacles, algae, and other undesirable organisms on surfaces exposed to a marine environment, particularly the submerged sections of ships and pleasure craft.

Triorganotin compounds of the formula $R_3SnX$ or $(R_3Sn)_2Y$ are known to be effective toxicants for antifouling coatings. Preferably R represents an alkyl radical containing between 1 and 4 carbon atoms or a phenyl radical. X and Y can represent a variety of suitable monovalent or divalent anionic radicals, respectively, including halogen (fluorine, bromine or chlorine), oxygen, sulfur and residues of carboxylic- or mercaptocarboxylic acids. When R represents a linear alkyl radical containing more than 4 carbon atoms or a cycloalkyl radical the compound is often not sufficiently toxic or is not leached out from the coating by sea water in large enough quantities and/or at a fast enough rate to provide control of barnacles and algae. These organisms attach themselves to the submerged portion of a vessel's hull and propagate to the extent that they interfere with the ability of the vessel to attain maximum speed and maneuverability. The vessel must be taken out of the water periodically and the accumulated organisms removed by scraping or sand blasting, following which the hull is repainted. This is a time-consuming and costly procedure.

An objective of this invention is to provide coating compositions which more effectively utilize certain organotin toxicants.

It has now been found that the performance of antifouling coating compositions containing as the toxicant certain asymmetric triorganotin compounds wherein 1 or 2 of the 3 hydrocarbon radicals bonded to the tin atom is generally associated with relatively inactive organotin toxicants is significantly improved when the asymmetric triorganotin compound is used in combination with a mixture of a suitable film-forming polymer and rosin in specified proportions as the film-forming component. The relative concentration of rosin in this mixture is inversely proportional to the solubility of the triorganotin compound in sea water, which can be readily determined using known techniques.

SUMMARY OF THE INVENTION

This invention provides an improved antifouling coating composition comprising between 5 and 30%, based on the total weight of said composition, of a mixture containing a film-forming polymer and rosin, a pigment, between 10 and 40%, based on the weight of said composition, of an organic liquid phase and between 1 and 25%, based on the weight of said composition, of an organotin compound of the formula $R_a{}^1R_{3-a}{}^2SnX$ or $(R_a{}^1R_{3-a}{}^2Sn)_2Y$ wherein $R^1$ is selected from the group consisting of alkyl radicals containing between 1 and 4 carbon atoms, inclusive, and $R^2$ is a cycloalkyl radical containing between 5 and 8 carbon atoms. The radical X represents fluorine, chlorine, bromine, hydroxyl, alkoxy ($-OR^3$), thioalkoxy ($-SR^3$) or a residue of a phenol or an aliphatic carboxylic acid, $-OOCR^3$, wherein $R^3$ is alkyl and contains between 1 and 12 carbon atoms. Y represents sulfur or oxygen, and a is the integer 1 or 2.

DETAILED DESCRIPTION OF THE INVENTION

The present antifouling coating compositions contain (1) an asymmetric triorganotin compound of the general formula $R_a{}^1R_{3-a}{}^2SnX$ or $(R_a{}^1R_{3-a}{}^2Sn)_2Y$ wherein $R^1$, $R^2$, X and a are as previously defined, (2) a mixture of a film-forming polymer and rosin and (3) an organic liquid in an amount required to achieve the desired solids content and viscosity. The solids content is usually between 30 and 75%, based on the weight of the coating composition, and the viscosity is generally from 70 to 100 k.u. (krebs units), depending upon the method to be employed in applying the coating, i.e., by brushing, spraying, etc. A pigment such as titanium dioxide together with relatively minor amounts of surfactants, mildewcides and other additives to facilitate dispersing of the pigment and/or application of the coating composition can also be present.

Tricyclohexyltin compounds have been evaluated as toxicants in a permeable coating and were found to be inactive against barnacles and algae. Tributyltin compounds such as tri-n-butyltin fluoride, are known to be excellent antifouling toxicants. It has now been found that the activity of certain tri-n-butyltin compounds is increased when one or two of the butyl radicals are replaced by cyclohexyl radicals and the ratio of film-forming polymer to rosin is within specified limits. This is considered surprising based on the poor performance of tricyclohexyltin compounds in the screening test described hereinafter. By varying the concentration of rosin in the paint film it is possible to control the leaching rate of the toxicant. Optimum performance for the present asymmetric triorganotin compounds is achieved when the weight of rosin is between 0.25 and 3 times the weight of the film-forming polymer. For a given triorganotin compound the optimum value within this range is dependent to a large extent upon the solubility of the compound in the sea water environment to which it is exposed during use. This can readily be determined using known techniques, one of which is described in a subsequent portion of this specification. If the rosin content employed for a relatively soluble compound is too high, most of the compound will be extracted from the coating during the first few days or weeks of exposure in sea water and will not provide the desired long term protection. At the other extreme, an insoluble organotin compound requires a larger relative concentration of rosin in the coating to provide an effective concentration of the organotin compound at the interface between the coating and the water inhabited by the fouling organisms.

The solubility of a given triorganotin compound in sea water, either natural or artificially prepared, is readily determined by adding a known amount of compound to a given volume of sea water, allowing the two phases to remain in contact for sufficient time to establish an equilibrium and then analyzing the liquid phase to determine the amount of tin present. A number of suitable techniques for this determination are known.

In addition to the major components (film-forming polymer, rosin, one or more of the present asymmetric organotin compounds, organic solvent and pigment), the present antifouling coating compositions often contain one or more conventional paint additives for the purpose of preventing development of mildew during storage, stabilizing the pigment dispersion, facilitating application of the paint and/or modifying the viscosity of the paint. An additional toxicant, particularly one which is effective in controlling algae growth, may also be included in the present compositions. A preferred member of this class of toxicants is zinc oxide.

The solvent employed is preferably a liquid organic hydrocarbon, a ketone, or mixtures thereof. Mixtures of xylene and methyl isobutyl ketone are particularly preferred. Minor amounts of low boiling alcohols containing between 1 and 3 carbon atoms may also be included as part of the solvent.

Many of the known film-forming organic polymers are suitable for use in formulations containing the present triorganotin compounds. The only limitations on the polymer are that it not be soluble in sea water or so susceptible to swelling that the triorganotin compound is leached out at too rapid a rate. Most polymers release the organotin compound at too slow a rate, and must be combined with rosin to achieve the desired concentration of organotin compound at the interface between the coating and the water in which the hull of the vessel is submerged.

Film-forming polymers suitable for use in the present coating formulations include vinyl chloride polymers, polymerized esters of vinyl alcohol and carboxylic acids containing between 2 and 12 carbon atoms, polyurethanes, polyolefins, polyesters, polyamides, chlorinated rubber, acrylic ester polymers, acrylonitrile/styrene/butadiene terpolymers and epoxide polymers. Copolymers wherein a major portion of the repeating units are derived from one or more of the aforementioned monomers, the remainder being residues of compounds which can be copolymerized with these monomers, are also useful. Representative members of the aforementioned classes of polymers include:
Vinyl alcohol-vinyl acetate copolymers
Methyl methacrylate-butyl acrylate copolymers
Copolymers of vinyl chloride with vinyl acetate, vinyl alcohol, vinylidene chloride, styrene, ethylene or acrylic acid esters such as methyl methacrylate As previously disclosed, the asymmetric triorganotin compounds which have now been found to exhibit what can only be considered synergistic antifouling performance are represented by the formula $R_a{}^1R_{3-a}{}^2SnX$ or $(R_a{}^1R_{3-a}{}^2Sn)_2Y$ wherein $R^1$ is $C_{1-4}$ alkyl and $R^2$ represents a cycloalkyl structure containing between 5 and 8 carbon atoms. Preferably $R^1$ is butyl and $R^2$ is cyclohexyl. The anionic portion of the molecule, represented by X in the foregoing equation, represents hydroxyl (—OH), a halogen atom or the residue obtained by removal of the acidic hydrogen atom from a carboxylic acid of the formula $R^3COOH$, an alcohol of the formula $R^3OH$, a mercaptan of the formula $R^3SH$ or a phenol. The term $R^3$ represents $C_{1-12}$ alkyl. The substituent represented by Y is either oxygen or sulfur.

When X represents halogen it can be fluorine, chlorine, bromine or iodine. If X is the residue of a carboxylic acid, the acid may be saturated or unsaturated and contain between 1 and 12 carbon atoms. The half esters of diacids such as maleic, succinic, hexandioic and octandioic acids are also suitable. Representative monocarboxylic acids include acetic, propionic, butyric, pentanoic, hexanoic, cyclohexane carboxylic, octanoic, decanoic and dodecanoic acids. Among the alcohols suitable for use in preparing the present organotin compounds are included methanol and ethanol together with the isomeric propanols, butanols, hexanols, octanols, decanols and dodecanols. The mercaptan analogs of the foregoing alcohols can be employed to prepare asymmetric triorganotin mercaptides in accordance with the present invention.

Asymmetric triorganotin compounds containing one or two cycloalkyl groups bonded to the tin atom are conveniently prepared by reacting the corresponding tetraorganotin compound, such as dicyclohexyldibutyl stannane, with a stannic halide. During this reaction one of the alkyl groups is replaced by a chlorine atom to yield the corresponding asymmetric triorganotin halide. Using tri-n-butylcyclohexyl stannane the reaction with stannic chloride can be represented by the following equation:

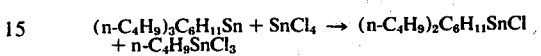

A preferred method for preparing the present asymmetric triorganotin compounds and their tetraorgano stannane precursors is described in U.S. Pat. No. 3,789,057, the pertinent sections of which are hereby incorporated by reference. The halides can readily be replaced by other anions such as hydroxyl, oxygen, sulfur and residues of carboxylic acids, using procedures described in the chemical and patent literature.

The following examples demonstrate preparation of representative asymmetric triorganotin compounds encompassed by the accompanying claims and the excellent performance of these compounds as antifouling toxicants relative to an accepted standard, tri-n-butyltin fluoride. All parts and percentages are by weight unless otherwise stated.

A convenient photometric analysis for determining tin is described in the publication Analytical Chemistry (Vol. 45, No. 3, pages 534–7), and is useful for detecting concentrations of tin as low as 0.01 part per million. In accordance with this method, the triorganotin compound is converted to a soluble inorganic stannic salt by the addition of concentrated sulfuric and nitric acids to a measured portion of the sea water followed by heating until fumes of sulfur trioxide are evolved. The concentrated sulfuric acid containing the solubilized tin is diluted with twice its volume of water, then treated with one volume of a solution of potassium iodide (200 g./liter) and extracted with hexane. To the resultant hexane solution is added exactly 20 cc. of a standardized aqueous solution containing 0.025 µg. of tin per cc. of solution. The standardized tin solution is conveniently prepared by dissolving 0.2500 g. of pure tin in 150 cc. of concentrated (12N) aqueous hydrochloric acid and diluting to a volume of 500 cc. with water. Hydrogen chloride is eliminated from a 10 cc. portion of the resultant solution by treating it with 50 cc. of concentrated (36N) sulfuric acid, 5 cc. of concentrated (16N) nitric acid and heating the solution until fumes of sulfur trioxide are evolved. Sufficient concentrated sulfuric acid is then added to attain a total weight of 100 g., after which between 150 and 200 cc. of water are added, followed by an aqueous solution containing 50 g. of citric acid and sufficient water to attain a total volume of 500 cc. The resultant solution contains 10 µg. of tin per cc. and is used to prepare a more dilute solution containing 50 g. of sulfuric acid and 25 g. of citric acid per liter and having a tin content of 0.025 µg./cc.

Following addition of the standardized tin solution to the hexane solution containing the sample to be analyzed, the two-phase mixture is shaken and separated. The hexane is washed twice with water, the aqueous phases combined and the hexane layer discarded. The combined aqueous phases are allowed to remain undisturbed for at least 2 hours, after which 2 cc. of an aqueous ascorbic acid solution (50 g. of acid per liter) and 5 cc. of a sensitized pyrocatechol violet solution are added. After 30 minutes the absorbance at a wavelength of 660 nm. is measured using a 100 mm. cell. After compensating for the absorbance of a blank sample prepared using the foregoing procedure but without any unknown sample present, the concentration of tin in the sample is read directly from a calibration curve which has been previously obtained by measuring the absorbance of several solutions containing known amounts of tin. These solutions are prepared using the procedure previously described for the preparation of the standardized tin solution. Between 1 and 20 cc. of an aqueous solution containing 0.5 $\mu$g. of tin per cc. is diluted to a volume of 20 cc. by adding the required volume of an aqueous solution containing 50 g. of sulfuric acid and 25 g. of citric acid per liter, after which 2 cc. of an aqueous solution containing 50 g. of ascorbic acid per liter is added together with sufficient water to attain a volume of 40 cc. To this solution is added 5 cc. of a sensitized pyrocatechol violet solution and sufficient water to attain a volume of 50 cc. The solution is allowed to remain undisturbed for 30 minutes, following which the absorbance at 660 nm. is measured using a cell length of 100 mm. Prior to each measurement the cell is rinsed twice with water, once with a (2N) aqueous hydrochloric acid solution and three times with the solution to be analyzed. The absorbance readings for each known sample tested are plotted as a function of the tin content of the sample.

The sensitized pyrocatechol violet solution is prepared by dissolving 12 mg. pyrocatechol violet in water for each 100 cc. of aqueous solution desired and adding 2 cc. of an aqueous solution containing 5.5 mg. of cetyl trimethyl ammonium bromide (CTAB) per cc. The solution should be prepared as needed.

To ensure reproducible results, each solution to be analyzed for tin in accordance with the foregoing procedure should conform to the following specification.

| | |
|---|---|
| Volume of test solution | 50 cc. |
| Total tin present | 0.5 $\mu$g. to 11 $\mu$g. |
| Sulfuric acid | 1.00 ± 0.05 gram. |
| Citric acid | 0.50 ± 0.02 gram. |
| Ascorbic acid | 0.10 ± 0.01 gram. |
| Pyrocatechol violet | 0.60 mg. ± 0.06 mg. |
| CTAB | 0.55 mg. ± 0.055 mg. |
| Temperature | 20 – 35° C. |
| Spectrophotometer wavelength | 660 nm. |
| Spectrophotometer slit | 0.10 |
| Path length | 10 cm. (5 cm. may also be used |

Before being analyzed each solution should remain undisturbed for between 25 and 35 minutes following addition of the pyrocatechol violet solution.

This procedure can also be used to measure the rate at which a given triorganotin compound is extracted from a film of a given polymer. This will enable one to select the film-forming polymer most suitable for use with a given asymmetric triorganotin compound. It may be more convenient to measure the tin content of the film rather than that of the sea water.

EXAMPLE 1

Preparation of Dicyclohexylbutyltin Chloride and Fluoride

A. Preparation of the Grignard Reagent, Cyclohexylmagnesium Chloride

To a nitrogen-filled reaction vessel equipped with a mechanically driven stirrer, addition funnel, water-cooled reflux condenser thermometer and nitrogen inlet was added 179.9 g. (7.4 moles) of magnesium metal turnings, 150 cc. of tetrahydrofuran and an "initiation mixture" containing 59.4 g. (0.5 mole) of cyclohexyl chloride and 81.6 g. (0.5 mole) of cyclohexyl bromide. About 8 minutes later the temperature of the reaction mixture rose spontaneously to 130° C. A mixture containing 737.0 g. (6.2 moles) of cyclohexyl chloride and 1500 cc. of tetrahydrofuran was added over a period of about 2.5 hours, during which time the contents of the flask were stirred at a moderate rate. Following completion of the addition the reaction mixture was heated at the boiling point for an additional 3 hours.

B. Preparation of Dicyclohexyldibutyl Stannane

A solution containing 1060 g. of dibutyltin dichloride and 1 liter of benzene was added to the Grignard reagent prepared as described in Section A of this example at a rate sufficient to maintain the temperature of the reaction mixture at 85° C. without external heating. Following completion of the addition, the reaction mixture was heated to the boiling point for 22 hours, after which 750 cc. of a 10% by weight aqueous solution of hydrochloric acid and 700 cc. water were added. The unreacted magnesium together with any other solid material was removed by filtration. The organic liquid phase was extracted using 500 cc. water containing about 40 g. of sodium chloride, followed by a second extraction of the organic layer using water, after which the organic liquid phase was filtered to remove solid material. Distillation of the liquid remaining after removal of solvent (tetrahydrofuran and benzene) yielded 1145.1 g. of dibutyldicyclohexyl stannane exhibiting a boiling range of 165°–185° C. at a pressure of between 0.9 and 1.5 mm. of mercury. Analysis by vapor phase chromatography indicated a purity of 96.2%.

C. Preparation of Dicyclohexylbutyltin Chloride

A mixture containing 2639 g. (6.61 moles) of dibutyldicyclohexyl stannane and 3.5 liters of pentane were placed in a reaction vessel equipped with a thermometer, mechanically driven stirrer, addition funnel, water-cooled reflux condenser, and nitrogen inlet. To this mixture was gradually added, over a 45-minute period, a solution containing 1723 g. (6.61 moles) of stannic chloride and 2 liters of pentane. The temperature of the reaction mixture was maintained at about 43° C. by adjusting the rate of addition, after which the reaction mixture was heated to 43° C. for 1 hour, then cooled to ambient temperature and allowed to remain undisturbed for about 16 hours. After washing the reaction mixture three times with a 15:1 weight ratio mixture of water: concentrated hydrochloric acid, the pentane was removed by distillation. The resultant solid material was recrystallized using 3 liters of warm methanol. The weight of the dried material was 2002 g. (80.3% yield based on the tetraorganotin compound). The product melted between 60.5° and 63.0° C.

D. Preparation of Dicyclohexylbutyltin Fluoride

To a solution of 113.3 grams (0.3 mole) dicyclohexylbutyltin chloride in 1 liter of methanol was added slowly, while stirring, a solution of 29.6 grams (0.315 moles, dry) of potassium fluoride dihydrate in 250 cc. methanol and 25 cc. water. The mixture was heated at the boiling point for 1 hour. After cooling the resultant suspension to 10° C., the solid phase was isolated and washed with a 10:90 volume ratio of methanol:water containing a small amount of a wetting agent. The white precipitate was dried to constant weight in a vacuum oven wherein the temperature was 50° C. The product yield was 107.0 grams (98.8%) of a white powder exhibiting the following analysis (in percent):

Found: Sn, 33.00; F, 5.47; Cl, 0.14; Theory: Sn, 32.87; F, 5.26; Cl, 0.0.

EXAMPLE 2

Preparation of Dibutylcyclohexyltin Chloride and Fluoride

Tributylcyclohexyl stannane was prepared using a procedure similar to that described in Example 1 for dibutyldicyclohexyl stannane, with the exception that a 25% molar excess of cyclohexylmagnesium chloride was reacted with tributyltin chloride. The boiling point of the product was 123° C. under a pressure of 0.7 mm. of mercury. A solution containing 37.3 grams (0.1 mole) of tributylcyclohexyl stannane in 50 cc. of pentane was placed in a reaction vessel equipped with a thermometer, mechanically driven stirrer, addition funnel, watercooled reflux condenser, and nitrogen inlet. To this was gradually added over a 25 minute period a solution containing 6.1 grams (0.1 mole) of stannic chloride in 50 cc. of pentane. During the addition, the temperature of the reaction mixture rose from 25° to 36° C. and the initially clear, colorless solution turned cloudy and yellow. After heating the solution to reflux temperature (36° C.) for 15 minutes, it was allowed to cool to ambient temperature. The product was extracted using 55 cc. of a 1.2 molar aqueous hydrochloric acid solution. The resultant two-phase mixture was transferred to a separatory funnel and the lower aqueous layer drawn off and discarded. The organic layer was extracted with two-50 cc. portions of 1.2 molar aqueous hydrochloric acid solution followed by two-50 cc. portions of water. The organic layer was then dried over anhydrous sodium sulfate, which was subsequently removed by filtration. The filtrate was concentrated using a rotary evaporator to yield 32.8 grams (93.2% yield) of dibutylcyclohexyltin chloride, a hazy, colorless liquid exhibiting an index of refraction ($n_D^{25}$) of 1.5079. The crude product was distilled under reduced pressure to yield 29.3 grams of dibutylcyclohexyltin chloride boiling between 139° and 140° C. at a pressure between 0.8 and 0.9 millimeter of mercury.

Analysis (in percent): Found: Sn, 33.84; Cl, 10.02; Theory: Sn, 33.77; Cl, 10.09.

To a solution containing 117.2 grams (0.33 mole) dibutylcyclohexyltin chloride in 250 cc. of methanol was added with stirring a solution 32.9 grams (0.35 mole) potassium fluoride dihydrate in 130 cc. of methanol and 6 cc. of water. A solid precipitate formed almost immediately. The suspension was stirred at room temperature for 1 hour then filtered. The solid material was washed with two 100 cc. portions of methanol followed by two 150 cc. portions of distilled water, then dried in a vacuum oven (50 mm. Hg) at 70° C. for 2 hours, after which the dry solid was stirred for 2.5 hours in water (1.5 liters) containing 10 drops of a wetting agent. The product, dibutylcyclohexyltin fluoride, was filtered, washed with deionized water until chloride-free and then dried to constant weight under reduced pressure.

Yield: 105.0 grams (94%) of a white solid, melting between 270° and 272°. Analysis (in percent): Found: Sn, 35.65; F, 5.54; Theory: Sn, 35.43; F, 5.67.

EXAMPLE 3

Evaluation of Representative Asymmetric Triorganotin Compounds as Antifouling Toxicants The efficacy as antifouling agents of two of the present asymmetric triorganotin compounds together with tricyclohexyltin hydroxide and tri-n-butyltin fluoride was investigated using a short-term screening procedure whereby the desired data could be generated in from 4 to 6 weeks compared to several months for conventional exposure tests.

A 1 gram portion of the toxicant candidate was homogeneously blended with 9.0 grams of an aqueous emulsion containing 55% by weight of a vinyl chloride-acrylic ester copolymer available as Resyn 2345 from the National Starch and Chemical Company. A 1.5 g. portion of the resultant mixture was coated onto the center portion of one surface of a square of polyvinyl chloride film. The square measured 6 inches (15 cm.) along each side and the coated area was in the shape of a circle measuring 2.6 inches (6.6 cm.) in diameter. After the coating had dried the films were secured to a white background which was in turn mounted on a suitable float such that the film was submerged at a depth of several inches at all times with the coated area facing the surface of the water. The float was then placed in the waters of Biscayne Bay near Miami Beach, Fla., where the conditions are particularly conducive to the development of fouling organisms. The films remained immersed for between 3 to 6 weeks, depending upon the time required for a control coating (which did not contain any toxicant) to become completely covered with barnacles and/or algae. The film samples were then withdrawn and the coated areas subjectively rated using a numerical scale from 3 (no fouling) to 0 (heavily fouled). Each candidate was evaluated in duplicate, and the results are summarized in the following table.

| Toxicant | Fouling Rating (2 samples) |
| --- | --- |
| Tricyclohexyltin Hydroxide (control) | 1,1 |
| Tri-n-butyltin Fluoride (control) | 2,2 |
| Dicyclohexylbutyltin Chloride | 3,3 |
| Dicyclohexylbutyltin Fluoride | 3,3 |
| Dibutylcyclohexyltin Chloride | 3,3 |
| Dibutylcyclohexyltin Fluoride | 3,3 |

The foregoing data demonstrate the superior performance of asymmetric triorganotin compounds containing one or two cyclohexyl groups. Surprisingly these compounds are more effective than tri-n-butyltin or tricyclohexyltin compounds. Theoretically the performance level of the asymmetric triorganotin compounds should be somewhere between that of the two symmetric compounds.

To determine whether the relatively poor performance of tricyclohexyltin hydroxide was due to the presence of the hydroxide species rather than fluoride, as was present in the other compounds tested, an exposure test was conducted using the foregoing procedure with tricyclohexyltin fluoride as the toxicant. The film was exposed for 6 weeks, at the end of which time the control film, which contained no toxicant in the coating, was completely fouled. In this instance the degree of fouling present on the coating surface was rated using a numerical scale of from 0 (completely fouled) to 10 (no fouling). Barnacles and algae were rated separately rather than in combination as was done to obtain the ratings set forth in the preceding table. Using tricyclohexyltin fluoride the rating for barnacles was 3 and the rating for algae was 0. This is equivalent to the extent of fouling previously observed on the coating containing tricyclohexyltin hydroxide. It was therefore concluded that in this instance the anion had no appreciable effect on the performance of the triorganotin compound as a toxicant.

Based on the poor performance of tricyclohexyltin compounds as antifouling toxicants, these compounds were not included in the long-term exposure tests described in the following example.

EXAMPLE 4

This example demonstrates the efficacy of representative asymmetrically substituted organotin compounds as antifouling toxicants when the compounds are incorporated into paint formulations wherein the weight ratio of vinyl chloride polymer (V) to rosin (R) is within the scope of the present invention. Three different paint formulations, designated A, B and C were employed. The composition of the formulations, on a weight % basis, is summarized in the following table. The vinyl polymer is a terpolymer wherein 94% of the repeating units are derived from vinyl chloride, 3% from vinyl acetate and 3% from vinyl alcohol (obtained by partial hydrolysis of the vinyl acetate units).

| Ingredients | % By Weight | | |
|---|---|---|---|
| | A | B | C |
| Titanium Dioxide | 17.59 | 17.86 | 17.14 |
| Zinc Oxide | 12.15 | 9.06 | 8.04 |
| Talc | 7.71 | 9.25 | 12.72 |
| Bentonite | 0.60 | 0.61 | 0.58 |
| Vinyl Polymer | 4.35 | 6.02 | 10.14 |
| Rosin | 13.01 | 11.60 | 6.77 |
| Methyl Isobutyl Ketone | 22.49 | 23.13 | 23.02 |
| Xylene | 21.98 | 22.31 | 21.42 |
| Methanol | 0.17 | 0.17 | 0.17 |

The organotin compounds tested included dicyclohexylbutyltin fluoride, dicyclohexylbutyltin chloride and bis(dibutylcyclohexyltin) sulfide. The dibutylcyclohexyltin compounds as a class were shown to be more soluble in ocean water than the corresponding dicyclohexylbutyltin compounds. Tri-n-butyltin fluoride was employed as a control.

The concentration of each triorganotin compound in the formulation was equivalent to a tin content of 4–5% by weight. For each of the triorganotin compounds tested, the weight of compound per 100 g. of paint formulation required to achieve this level of tin content was as follows:

| | |
|---|---|
| dicyclohexylbutyltin fluoride | ($Cy_2BuSnF$) - 13.8 g. |
| dicyclohexylbutyltin chloride | ($Cy_2BuSnCl$) - 14.4 g. |
| bis(dibutylcyclohexyltin) sulfide | [$(Bu_2CySn)_2S$] 13.7 g. |
| tri-n-butyltin fluoride | ($BU_3SnF$) - 11.9 g. |

The formulations were individually evaluated for antifouling performance by applying two coats of each formulation to both sides of a steel or fiberglass-reinforced polyester panel. The coated panels were then immersed in the waters of Biscayne Bay near Miami Beach, Fla. The steel panels were secured to a raft in a manner which kept the entire panel submerged at all times. The polyester panels were secured at the water line of the raft such that the upper third of each panel was above the water line at all times. This is considered a more severe test than complete submergence, since it is usually at the water line of ships where the growth of fouling organisms proceeds most rapidly.

Each of the test panels was withdrawn at monthly intervals and rated by recording the number of barnacles present on the most highly fouled surface and the percent of that surface which was covered with algae. The results obtained are summarized in the following table. The formulations employed to prepare the coatings are identified by the letter A, B or C, as defined in the preceding table. The substrate to which the coating was applied is designated by the letters S and F, which represent steel and fiberglass-reinforced polyester, respectively.

| Organotin Compound | Paint Form | Vinyl/ Rosin Weight Ratio | Substrate | No. of Barnacles/% Algae Coverage After | | | | | | | | |
|---|---|---|---|---|---|---|---|---|---|---|---|---|
| | | | | 1 mo. | 2 mos. | 3 mos. | 4 mos. | 5 mos. | 6 mos. | 7 mos. | 8 mos. | 9 mos. |
| $Cy_2BuSnF$ | A | 0.30 | S | 0/0 | 0/1 | 0/0 | 0/2 | 0/1 | 0/3 | 2/4 | 6/2 | 6/1 |
| $Cy_2BuSnF$ | A | 0.30 | F | 0/0 | 0/0 | 0/0 | 0/2 | i/5 | i/30 | 10/8 | 30/10 | 20/5 |
| $Cy_2BuSnF$ | B | 0.53 | S | 0/0 | 1/1 | 1/1 | 1/1 | 3/1 | 3/2 | i/4 | 0/2 | 2/3 |
| $Cy_2BuSnF$ | B | 0.53 | F | 0/1 | 0/2 | 0/1 | 0/1 | 0/1 | 0/5 | 0/15 | 0/18 | 0/1 |
| $Cy_2BuSnCl$ | B | 0.53 | F | 0/0 | 0/0 | 0/0 | 0/1 | 0/2 | 0/15 | 6/5 | 30/3 | 30/10 |
| $(Bu_2CySn)_2S$ | B | 0.53 | F | 0/0 | 0/0 | 0/2 | 0/2 | 0/3 | 0/15 | 0/20 | 16/30 | 16/30 |
| Control $Bu_3SnF$ | C | 1.5 | F | 0/0 | 0/0 | 0.1 | 0/2 | 0/6 | 10/6 | 25/2 | 90/2 | 95/15 |

| Organotin Compound | Paint Form. | Vinyl/ Rosin Weight Ratio | Substrate | No. of Barnacles/% Algae Coverage After | | | | | | | | |
|---|---|---|---|---|---|---|---|---|---|---|---|---|
| | | | | 10 mos. | 11 mos. | 12 mos. | 13 mos. | 14 mos. | 15 mos. | 16 mos. | 17 mos. | 18 mos. |
| $Cy_2BuSnF$ | A | 0.30 | S | 9/2 | 10/1 | 10/3 | 10/5 | TESTING DISCONTINUED | | | | |

-continued

| | | | | | | | | | | | |
|---|---|---|---|---|---|---|---|---|---|---|---|
| Cy$_2$BuSnF | A | 0.30 | F | 20/3 | 20/10 | 15/15 | 15/20 | 15/20 | 20/20 | 20/80 | 20/85 | 20/85 |
| Cy$_2$BuSnF | B | 0.53 | S | 2/4 | 2/2 | 2/3 | 4/10 | TESTING DISCONTINUED | | | |
| Cy$_2$BuSnF | B | 0.53 | F | 0/2 | i/5 | i/2 | i/2 | i/5 | i/15 | i/45 | 10/45 | 10/50 |
| Cy$_2$BuSnCl | B | 0.53 | F | 40/15 | 40/15 | 95/25 | TESTING DISCONTINUED | | | |
| (Bu$_2$CySn)$_2$S | B | 0.53 | F | 16/20 | 16/30 | 16/20 | 15/25 | 25/20 | 15/25 | 15/30 | 15/40 | 20/45 |
| Control | | | | | | | | | | | | |
| Bu$_3$SnF | C | 1.5 | F | TESTING DISCONTINED | | | | | | | | i = INCIPIENT BARNACLE GROWTH
C.F. = PANEL COMPLETELY COVERED WITH FOULING ORGANISMS

The data from the exposure tests summarized in the foregoing table demonstrate that the efficacy of the present organotin compounds is dependent upon the weight ratio of vinyl chloride polymer to rosin in the paint formulation, which in turn determines the permeability of the paint film. Dicyclohexylbutyltin fluoride is the most insoluble of the compounds tested and was most effective in a formulation wherein the weight ratio of vinyl chloride polymer to rosin was 0.53. The compound was not nearly so effective when the relative amount of rosin was increased (polymer/rosin weight ratio = 0.3). This would indicate that the organotin compound was leached out too rapidly at the higher level of rosin. When incorporated into a relatively porous formulation (A), dibutylcyclohexyltin fluoride failed between 4 and 6 months. Bis(dibutylcyclohexyltin) sulfide was effective when the vinyl/rosin weight ratio was 0.53. The solubility in sea water of dicyclohexylbutyltin chloride is greater than that of the aforementioned sulfide as reflected in the intermediate level of performance exhibited by the chloride as an antifouling toxicant when employed using a vinyl chloride polymer/rosin ratio of 0.53.

Tributyltin fluoride is known to be an effective antifouling toxicant. The compound is considerably more soluble in sea water than any of the asymmetric triorganotin compounds tested, and should therefore require proportionately less rosin in the formulation. Formulation C with a vinyl chloride polymer/rosin (V/R) ratio of 1.5 is typical for a formulation that will provide protection against fouling organisms for a single season using tri-n-butyltin fluoride as the toxicant.

The relative performance levels of dibutylcyclohexyltin and dicyclohexylbutyltin compounds observed at V/R ratios of 0.3 and 0.53 are reversed when the V/R ratio is increased to 1.5. This indicates that the optimum coating permeability is somewhere between that obtained at V/R ratios of 0.53 and 1.5 for formulations containing dicyclohexylbutyltin fluoride. Once the optimum value is exceeded, the rate at which the compound is extracted from the coating apparently decreases due to the lower rosin content and the resulting lower permeability of the coating. The composition of the aforementioned formulation exhibiting a V/R ratio of 1.5 was as follows:

| | |
|---|---|
| Titanium Dioxide | 24.59 parts |
| Talc | 6.85 parts |
| Bentonite | 0.62 part |
| Vinyl Chloride Terpolymer | 10.82 parts |
| Rosin | 7.22 parts |
| Methyl Isobutyl Ketone | 26.86 parts |
| Xylene | 27.86 parts |
| Methanol | 0.18 part |

The vinyl chloride terpolymer was identical to that described for the preceding formulations A–C.

Other film-forming polymers can be substituted for the vinyl chloride terpolymer employed in the preceding formulations. To achieve optimum performance the permeability of these coatings should be equivalent to that of a coating containing the aforementioned vinyl chloride terpolymer and rosin in the preferred weight ratio for the particular triorganotin compound. The combination of coating permeability and solubility of the triorganotin compound will determine the rate at which the triorganotin compound is released from the coating. This, in turn, can be readily determined by immersing the coating in sea water and measuring the concentration of tin in the coating following a specified exposure period. A suitable analytical procedure is described in the preceding specification.

What is claimed is:

1. An antifouling coating composition comprising between 5 and 30% by weight of film-forming synthetic organic film-forming polymer and rosin, a pigment, between 10 and 40% by weight of an organic liquid diluent and between 1 and 25% by weight of a triorganotin compound of the formula $R_a^1R_{3-a}^2SnX$ or $(R_a^1R_{3-a}^2Sn)_2Y$, wherein $R^1$ is selected from the group consisting of alkyl radicals containing between 1 and 4 carbon atoms, $R^2$ is a cycloalkyl radical containing between 5 and 8 cyclic carbon atoms, X is selected from the group consisting of fluorine, chlorine, bromine, hydroxyl, alkoxy ($-OR^3$), thioalkoxy ($-SR^3$) and carboxyl radicals, ($-OOCR^3$), wherein $R^3$ is alkyl and contains between 1 and 12 carbon atoms, Y is oxygen or sulfur and a is the integer 1 or 2, and wherein the weight of rosin in said composition is between 0.25 and 3 times the weight of said film-forming polymer.

2. An antifouling coating composition as described in claim 1 wherein $R^1$ represents butyl and $R^2$ represents cyclohexyl.

3. An antifouling coating composition as described in claim 1 wherein X is fluorine, chlorine, bromine or iodine.

4. An antifouling coating composition as described in claim 1 wherein Y is sulfur.

5. An antifouling composition as described in claim 1 wherein the film-forming polymer is a vinyl chloride copolymer.

* * * * *